R. H. DEMENT.
Wagon Brake.

No. 113,636.

Patented Apr. 11, 1871.

United States Patent Office.

ROBERT H. DEMENT, OF HUDSON, ILLINOIS.

Letters Patent No. 113,636, dated April 11, 1871.

IMPROVEMENT IN WAGON-BRAKES.

The Schedule referred to in these Letters Patent and making part of the same.

*To all whom it may concern:*

Be it known that I, ROBERT H. DEMENT, of Hudson, in the county of McLean and State of Illinois, have invented a new and improved Brake for Wagons and Cars; and I do hereby declare that the following is a full, clear, and exact description thereof which will enable others skilled in the art to make and use the same, reference being had to the accompanying drawing forming part of this specification, in which—

Similar letters of reference indicate corresponding parts.

Figure 1:
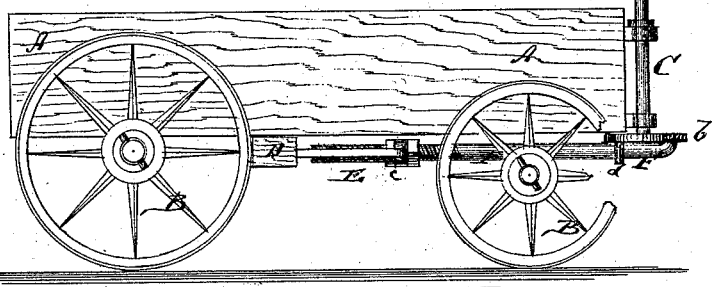
Figure 1 represents a side elevation of a wagon provided with my improved brake.
Figure 2:
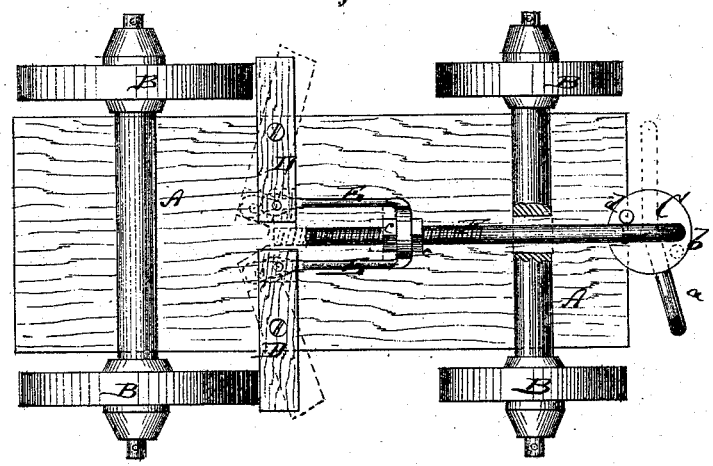
Figure 2 is an inverted plan view of the same.

This invention relates to a new self-locking brake, which is applicable to all kinds of wheeled vehicles, such as wagons, carriages, cars, trucks, &c.; and consists in the combination of a series of pivoted shoes with a sliding yoke and eccentric disk on the brake-stem, all operating so that by carrying the wrist-pin in the eccentric ahead of or behind the axis of the stem the shoes will be locked in their respective position.

The invention consists also in securing the aforesaid yoke to the rod by means of nuts to make it adjustable, so that the shoes can be easily reset when worn.

A in the drawing represents the body or frame of a wagon or other wheeled vehicle, B B being the wheels of the same.

C is the brake-stem, hung vertically in one end of the body or frame A, and provided with a hand-wheel, $a$, at the upper end, and with a disk, $b$, at the lower end.

D D are the brake-shoes pivoted to the under side of the frame or body A.

Their inner ends are pivoted to the ends of a yoke, E.

F is a rod which connects the yoke E with the disk $b$.

The front end of the rod is by a wrist-pin connected with the plate $b$ so that it will be moved forward or backward at will by the turning of the stem.

The inner or back end of the rod F is fitted through the yoke, and receives nuts $c\ c$ in front and rear of same, so that it can be secured and adjusted at will.

The brake-shoes are applied to the wheels by turning the hand-wheel so as to draw the wrist-pin forward of the stem, a stop-pin, $d$, on the disk $b$ defining the limit of movement.

When the brakes are thus applied they are automatically locked, as the wrist-pin cannot be drawn back by a direct pull on the connecting-rod, but only by turning the stem. The brakes are in the same way held and locked clear of the wheels when the wrist-pin is turned inside of the stem.

Having thus described my invention,

I claim as new, and desire to secure by Letters Patent—

1. The brake-shoes, combined by the yoke E, rod F, eccentric disk $b$, and stem C, so that they will be applied and locked by the turning of the stem, as set forth.

2. The yoke E, connecting with the brake-shoes, and secured to the rod F by means of the nuts $c\ c$, to be adjustable, as set forth.

ROBERT H. DEMENT.

Witnesses:
C. POTTER,
J. A. KUHN.